(12) United States Patent
Allen et al.

(10) Patent No.: US 9,298,697 B2
(45) Date of Patent: Mar. 29, 2016

(54) TECHNIQUES FOR GRAMMAR RULE COMPOSITION AND TESTING

(75) Inventors: Andrew T. Allen, Phoenix, AZ (US);
Ken R. Myers, Gilbert, AZ (US); John M. Chan, Chandler, AZ (US); Michelle N. Bomer, Queen Creek, AZ (US);
Catherine Yackshaw, Chandler, AZ (US)

(73) Assignee: Apollo Education Group, Inc., Phoenix, AZ (US)

( * ) Notice: Subject to any disclaimer, the term of this patent is extended or adjusted under 35 U.S.C. 154(b) by 1292 days.

(21) Appl. No.: 12/693,870

(22) Filed: Jan. 26, 2010

(65) Prior Publication Data
US 2011/0185284 A1    Jul. 28, 2011

(51) Int. Cl.
*G06F 17/00* (2006.01)
*G06F 17/27* (2006.01)

(52) U.S. Cl.
CPC .................................. *G06F 17/274* (2013.01)

(58) Field of Classification Search
CPC ............................... G06F 17/27; G06F 17/274
USPC ......................................................... 715/257
See application file for complete search history.

(56) References Cited

U.S. PATENT DOCUMENTS

| | | | | |
|---|---|---|---|---|
| 5,068,789 | A * | 11/1991 | van Vliembergen | 704/9 |
| 5,907,839 | A * | 5/1999 | Roth | |
| 6,012,075 | A * | 1/2000 | Fein et al. | 715/256 |
| 6,085,206 | A * | 7/2000 | Domini et al. | 715/257 |
| 6,618,697 | B1 * | 9/2003 | Kantrowitz et al. | 703/22 |
| 6,684,183 | B1 * | 1/2004 | Korall et al. | 704/9 |
| 7,437,659 | B2 * | 10/2008 | Taniwaki et al. | 715/200 |
| 7,562,295 | B1 * | 7/2009 | Jones et al. | 715/257 |
| 7,676,705 | B2 * | 3/2010 | Johnson et al. | 714/57 |
| 7,711,551 | B2 * | 5/2010 | Lopez-Barquilla et al. | 704/9 |
| 7,933,763 | B2 * | 4/2011 | Lawson et al. | 704/2 |
| 7,937,657 | B2 * | 5/2011 | Bates et al. | 715/257 |
| 8,176,527 | B1 * | 5/2012 | Njemanze et al. | 726/2 |
| 8,494,977 | B1 * | 7/2013 | Yehuda | G06Q 10/00 706/11 |
| 2002/0165877 | A1 * | 11/2002 | Malcolm et al. | 707/507 |
| 2003/0050772 | A1 * | 3/2003 | Bennett | 704/9 |

(Continued)

OTHER PUBLICATIONS

Title: Arts PDF Split & Merge Lite/Plus Version 2.2, Date: Jun. 12, 2004, URL: <http://artspdf.com/pdfs/APSplitMerge_User_Guide.pdf>.*

(Continued)

*Primary Examiner* — Scott Baderman
*Assistant Examiner* — Mustafa Amin
(74) *Attorney, Agent, or Firm* — Hickman Palermo Becker Bingham LLP

(57) ABSTRACT

Techniques are provided for composing and testing grammar rules that are configured to provide feedback on violations of target grammar guidelines in the text of documents. Tests may be performed to determine whether a new grammar rule produces false positives, is redundant or conflicts with other rules, or is expensive to apply to a document. A user may test the rule, in isolation or with other rules, on a batch of documents. A display of a summary of feedback that is generated in the batch of documents by the rules is provided. The user may also apply a rule to documents submitted for feedback as a hidden rule. Any violations of a hidden rule are recorded, but feedback on the violations is not provided in submitted documents. Furthermore, a user may indicate a level for a rule, which may control the set of documents to which the rule is applied.

28 Claims, 8 Drawing Sheets

(56) References Cited

U.S. PATENT DOCUMENTS

| | | | |
|---|---|---|---|
| 2003/0200093 A1* | 10/2003 | Lewis et al. | 704/260 |
| 2003/0237055 A1* | 12/2003 | Lange et al. | 715/530 |
| 2004/0030540 A1* | 2/2004 | Ovil et al. | 704/1 |
| 2004/0072136 A1* | 4/2004 | Roschelle et al. | 434/350 |
| 2004/0133452 A1* | 7/2004 | Denny et al. | 705/2 |
| 2004/0139370 A1* | 7/2004 | Bailey | G06F 11/3624 714/38.1 |
| 2005/0283726 A1* | 12/2005 | Lunati | 715/533 |
| 2006/0062462 A1* | 3/2006 | Li et al. | 382/186 |
| 2006/0123329 A1* | 6/2006 | Steen et al. | 715/500 |
| 2006/0190804 A1* | 8/2006 | Yang | 715/500 |
| 2007/0016401 A1* | 1/2007 | Ehsani et al. | 704/9 |
| 2007/0162847 A1* | 7/2007 | Tunning et al. | 715/533 |
| 2008/0052619 A1* | 2/2008 | Illg | 715/257 |
| 2008/0307490 A1* | 12/2008 | Van Wyk et al. | 726/1 |
| 2009/0006080 A1* | 1/2009 | Fuji et al. | 704/9 |
| 2009/0145962 A1* | 6/2009 | Ramachandran | 235/379 |
| 2009/0157679 A1* | 6/2009 | Elias et al. | 707/6 |
| 2009/0192787 A1* | 7/2009 | Roon | 704/9 |
| 2009/0265160 A1* | 10/2009 | Williams et al. | 704/9 |
| 2009/0319927 A1* | 12/2009 | Beeman et al. | 715/764 |
| 2010/0010801 A1* | 1/2010 | Meijer et al. | 704/9 |
| 2010/0125450 A1* | 5/2010 | Michaelangelo et al. | 704/9 |
| 2010/0293451 A1* | 11/2010 | Carus | 715/230 |
| 2011/0184722 A1* | 7/2011 | Sneddon et al. | 704/7 |
| 2011/0301943 A1* | 12/2011 | Patch | 704/9 |
| 2011/0313757 A1* | 12/2011 | Hoover et al. | 704/9 |
| 2012/0117465 A1* | 5/2012 | Carmel et al. | 715/256 |

OTHER PUBLICATIONS

Alexander, M et al., "The Center for Writing Excellence" University of Phoenix downloaded from the Internet Apr. 7, 2010 < http://www.aacu.org/meetings/technology_learning/tech06/documents/Phoenix.pdf > (20 pages).

"Philosophy on Adult Education" University of Phoenix downloaded from the Internet Apr. 8, 2010 < http://www.aacu.org/meetings/technology_learning/tech06/documents/Phoenix1.pdf > (5 pages).

* cited by examiner

202 — Master Rule ID: [New]
204 — Name: Overly Long Sentence
206 — Level: Collegiate
208 — Category: Punctuation
210 — Max Inserts of Long Comment: No Limit
212 — Max Inserts of Short Comment: No Limit
214 — Explanation:

A very long sentence, such as this sentence, which has 55 or more words, can be confusing in that it can obscure the meaning of the sentence with logic twists and recursions, which can be very confusing to a reader, and should be cut into shorter sentences that each embody a single idea that is easier to comprehend 216 — Active: ☐
218 — Active for Testing Batches: ☐
220 — Hidden: ☐
222 — Notes:

230 [ test ]   232 ☑ Highlight Match
English ▽

A very long sentence, such as this sentence, which has 55 or more words, can be confusing in that it can obscure the meaning of the sentence with logic twists and recursions, which can be very confusing to a reader, and should be cut into shorter sentences that each embody a single idea that is easier to comprehend. *[A sentence as long as this (55 or more words) can be confusing. Cut it into shorter sentences.]* — 234

224 — Pattern: `(\w+[,;]?\s){55,56}[^.]*[.]\s`
226 — Comments:

English
Long: A sentence as long as this (55 or more words) can be confusing.  Cut it into shorter sentences.
Short: This sentence is too long.

FIG. 5 search
Characters Before: 30 — 504
Characters After:: 10 — 506
Highlight: ☑ — 508
Show Comment: ☑ — 510
[ update ] — 512

| Rule ID ⬍ | Document Name ⬍ | Text |
|---|---|---|
| 130 | accbible.docx | ... all actions comply with local, state and federal codes when applicable.[Insert a comma before "and" if the following it is the last in a series of more than two] Ensure al... |
| 130 | accbible.docx | ...ould promptly provide proposals, follow up and status changes in a timely manner in accordance with governing bodies and laws.[Insert a comma before "and" if the following it is the last in a series of more than two] Agents sh... |
| 130 | accbible.docx | ...inciples, as well as the State, Federal and industry privacy principals.[Insert a comma before "and" if the following it is the last in a series of more than two] FREE... |
| 102 | accbible.docx | ...of personal, professional, and moral[Misspelling--morale] integrity... |
| 123 | accbible.docx | ...d promptly provide proposals, follow up[Spelling: these two words should be a single hyphenated word] and statu... |
| 142 | accbible.docx | ...a higher standard as well. (a)Employees[Leave a space after the closing parenthesis] and staff... |
| 142 | accbible.docx | ...hest integrity and honesty. (b)Employees[Leave a space after the closing parenthesis] and staff... |
| 142 | accbible.docx | ...rest is first and foremost. (d)Employees[Leave a space after the closing parenthesis] and staff... |
| 130 | biopaper2.doc | ...d in DNA are adenine, cytosine, guanine and thymine.[Insert a comma before "and" if the following it is the last in a series of more than two] The bases... |

⏮ ◀ 1/467 ▲ ▼ 10 ▶ — 514

500

502

FIG. 6 search

Characters Before: 30 — 504
Characters After:: 10 — 506
Highlight: ☐ — 508
Show Comment: ☑ — 510

[update] — 512

| Rule ID | Document Name | Text | Correct? |
|---|---|---|---|
| 130 | accbible.docx | ...all actions comply with local, state and federal codes when applicable.[Insert a comma before "and" if the following it is the last in a series of more than two] Ensure al... | YES |
| 130 | accbible.docx | ...ould promptly provide proposals, follow up and status changes in a timely manner in accordance with governing bodies and laws.[Insert a comma before "and" if the following it is the last in a series of more than two] Agents sh... | YES |
| 130 | accbible.docx | ...inciples, as well as the State, Federal and industry privacy principals.[Insert a comma before "and" if the following it is the last in a series of more than two] FREE... | YES |
| 102 | accbible.docx | ...of personal, professional, and moral[Misspelling: morale] integrity... | NO |
| 123 | accbible.docx | ...d promptly provide proposals, follow up[Spelling: these two words should be a single hyphenated word] and statu... | YES |
| 142 | accbible.docx | ...a higher standard as well. (a)Employees{Leave a space after the closing parenthesis} and staff... | |
| 142 | accbible.docx | ...hest integrity and honesty. (b)Employees{Leave a space after the closing parenthesis} and staff... | |
| 142 | accbible.docx | ...rest is first and foremost. (c)Employees{Leave a space after the closing parenthesis} and staff... | |
| 130 | biopaper2.doc | ...d in DNA are adenine, cytosine, guanine and thymine.[Insert a comma before "and" if the following it is the last in a series of more than two] The bases... | |

— 514

|◀ ◀ 1/467 ▶ ▶| 10 ▶

600

TECHNIQUES FOR GRAMMAR RULE COMPOSITION AND TESTING

FIELD OF THE INVENTION

The present invention relates to the composition and testing of grammar rule patterns used to identify violations of grammar guidelines in the text of documents.

BACKGROUND

The grammar guidelines of a particular natural language, e.g., English, Spanish, etc., impose structure on the natural language. Grammar guidelines for a particular natural language facilitate communication and understanding of spoken, and especially written, words in the language.

It is important that written information in a natural language follow the grammar guidelines of the language. Conformance to grammar guidelines is especially important in formal documents, such as research papers, resumes, and legal documents. Not only is conformance to grammar guidelines important in formal documents, conformance is expected. A formal document that does not conform to the appropriate grammar guidelines may be discounted or ignored by the audience of the document. However, it can be difficult to learn and correctly apply the various grammar guidelines of a natural language. For example, English has grammar guidelines for capitalization, hyphenation, etc., that may be counterintuitive.

Grammar tools have been developed to aid authors in conforming documents to the grammar guidelines of natural languages. Such tools may give an author feedback on applying one or more grammar guidelines to the text of a document. A grammar tool may have, encoded into the tool, one or more grammar rules. Each grammar rule is typically designed to detect violations of grammar guidelines. For any given grammar rule, there are one or more "target grammar guidelines" whose violations the rule is intended to identify. The value of a grammar rule hinges on (a) how frequently the "violations" identified by the rule are actual violations of its target grammar guidelines, and (b) what percentage of violations of its target grammar guidelines the rule actually catches.

It is important that a grammar rule correctly identify violations of its target grammar guidelines within the text of a document. For example, a tool that includes a grammar rule that is overbroad will produce "false positives" that identify, as violations, text that is not actually a violation. The production of too many false positives may frustrate the author. Furthermore, a poorly written grammar rule may be costly to apply to a document, may be redundant with already-existing grammar rules, or may even be contradictory to (a) other grammar rules or (b) its own grammar guidelines. Therefore, it is important to thoroughly test the performance of grammar rules before the rules are used to provide feedback to authors.

One method of testing the performance of a particular grammar rule is to apply the rule to a document, and to have a human inspect the document to determine whether the feedback generated by the rule is appropriate, given the content of the document. However, it is costly to have humans inspect documents by hand. A more efficient method of testing the performance of grammar rules is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an example graphical user interface for gathering information about a new grammar rule definition.

FIGS. 5 and 6 illustrate example graphical user interfaces to display information about the results of a test run.

DETAILED DESCRIPTION

Figure 1:
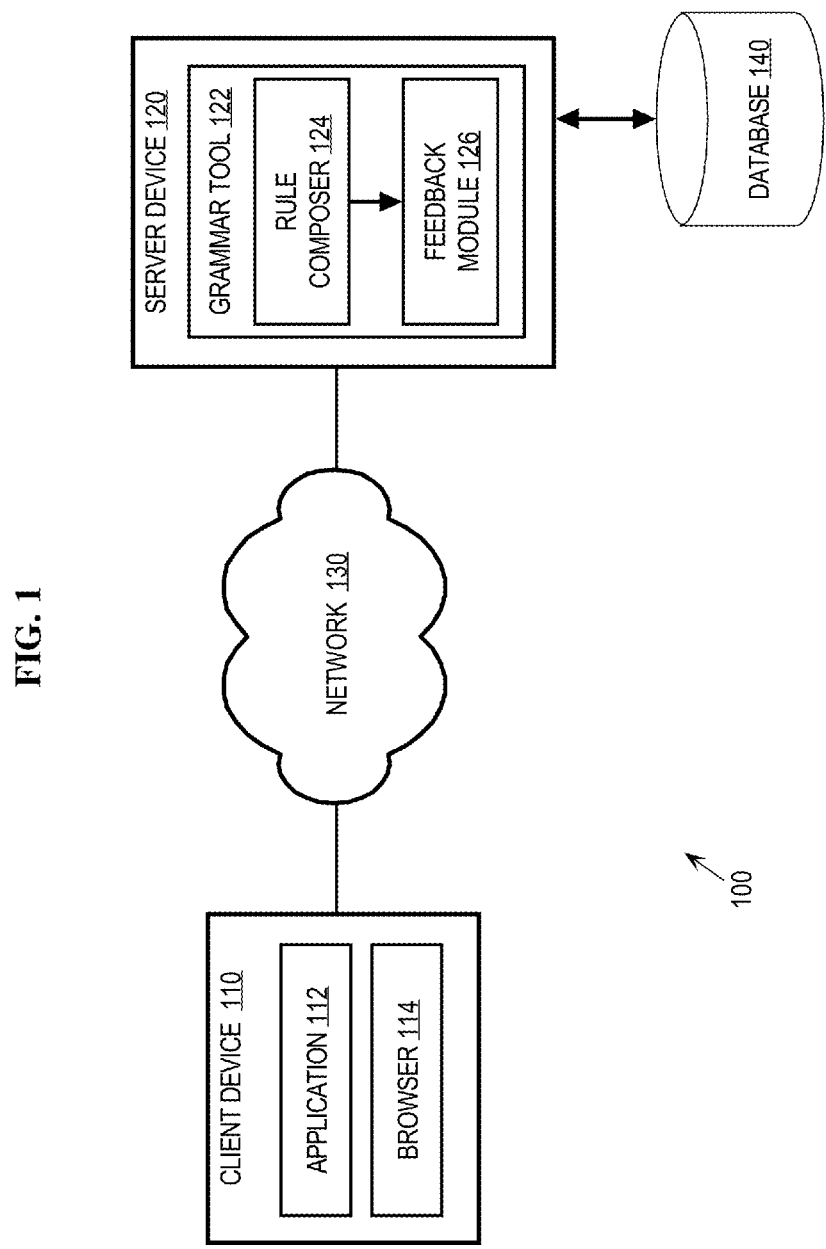
FIG. 1 is a block diagram that depicts an example network arrangement for authoring and testing grammar rule definitions and applying the resulting rules to documents.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for composing grammar rules and testing the performance of grammar rules. A user may provide a pattern and various attributes for a new grammar rule definition. The user may then test the performance of the new rule. For example, the user may perform tests to determine whether the new grammar rule produces false positive results, is redundant or conflicts with other rules, or takes too much time to apply to a document, etc. Based on the results of one or more tests, the user may choose to refine the rule's definition.

The user may test a grammar rule against a string that is known to include a violation of a grammar guideline that is targeted by the rule. The user is informed of feedback that is generated in response to applying the grammar rule to the string. The user may also test the rule, in isolation or in conjunction with other rules, on a batch of documents. A summary of feedback that is generated in the batch of documents by the one or more rules is provided in a display.

The user may also deploy the new grammar rule in a live setting, to be applied to documents that are submitted to a grammar tool for feedback. The user may indicate that the rule is to be a hidden rule. In the case of a hidden rule, any violations that are detected based on the rule are recorded so that the rule designer can see the violations indicated by the rule, but feedback on the violations identified by the rule is not provided back to the document creators in the submitted documents themselves. Based on the recorded rule violations, a summary of violations of grammar rules, both hidden and unhidden, may be displayed.

In the definition of a rule, a user may indicate that the rule is associated with a level. In one embodiment of the invention, a particular rule is only applied to documents that correspond to the level of the particular rule's definition. In another embodiment of the invention, a particular rule is applied to documents that correspond to either (a) the level of the particular rule's definition, or (b) a level that is below the level of the particular rule's definition. Thus, the user may control the set of documents to which a particular rule is applied.

The Grammar Tool

For purposes of illustration, an example grammar tool is discussed herein. The example grammar tool is configured to apply a set of grammar rules to the text of a document that is submitted to the tool, and to provide feedback on the text of the document based on the application of the grammar rules. A grammar rule is based on a definition that includes the attributes of the rule.

The definition of a grammar rule indicates one or more patterns in sequences of characters (i.e. strings). When a string within a document matches the pattern specified by a grammar rule, the rule is said to "flag" the string. A string that is flagged by a grammar rule is treated as a violation of target grammar guideline of the grammar rule. The definition of a grammar rule may also include one or more comments to insert into the text of the document at or near a string that is flagged by the rule. These comments allow the author of the analyzed document to receive guidance in conforming the document more fully to grammar guidelines. Thus, a grammar rule is configured to flag and explain violations of the grammar guideline that is targeted by the grammar rule. The grammar guidelines of a natural language may include guidelines concerning punctuation, hyphenation, capitalization, spelling, word placement, verb tense, formality of words and phrases, and other commentary on word choice and usage, etc.

For example, a grammar tool may include a particular grammar rule that is configured to flag sentences that are too long, which can be confusing to a reader and thus violate a grammar guideline. An author of a particular document submits the document to the grammar tool for feedback, and the particular grammar rule is applied to the submitted document. If the particular grammar rule flags a string in the document, the grammar tool may insert the following feedback phrase, associated with the definition of the grammar rule, after the end of the flagged string: "A sentence as long as this (55 or more words) can be confusing. Cut it into shorter sentences."

Grammar Checking Architecture

In one embodiment of the invention, the grammar tool resides on a server and provides grammar feedback over a network. FIG. 1 is a block diagram that depicts an example network arrangement 100 for authoring and testing grammar rule definitions and applying the resulting grammar rules to documents in order to provide grammar feedback on the documents, according to embodiments of the invention. Example network arrangement 100 includes a client device 110, and a server device 120, communicatively coupled via network 130. Server device 120 is also communicatively coupled to a database 140.

Client device 110 may be implemented by any type of client device. Example implementations of client device 110 include, without limitation, workstations, personal computers, laptop computers, personal digital assistants (PDAs), cellular telephony devices, and any type of mobile devices. In example network arrangement 100, client device 110 is configured with an application 112 and a browser 114. Examples of application 112 include, without limitation, a word processor, a spreadsheet program, an email client, etc. Browser 114 is configured to interpret and graphically display web pages received over network 130, such as Hyper Text Markup Language (HTML) pages, and Extensible Markup Language (XML) pages, etc. In one embodiment of the invention, client device 110 is configured without one or more of application 112 and browser 114. Client device 110 may also be configured with other mechanisms, processes, and functionality, depending upon a particular implementation.

Client device 110 is configured to communicate with other devices, such as server device 120, over network 130. Network 130 may be implemented with any type of medium and/or mechanism that facilitates the exchange of information between client device 110 and server device 120. Furthermore, network 130 may use any type of communications protocol, and may be secured or unsecured, depending upon the requirements of a particular application.

Server device 120 may be implemented by any type of device that is capable of communicating with client device 110 over network 130. In example network arrangement 100, server device 120 is configured with grammar tool 122. Grammar tool 122, as explained in more detail below, is capable of producing web pages to be sent over network 130 to client device 110 to facilitate communication between grammar tool 122 and a user of client device 110. Grammar tool 122 is further configured to receive documents over network 130, e.g., through File Transfer Protocol (FTP) SSH File Transfer Protocol (SFTP), HyperText Transfer Protocol (HTTP), etc. Server device 120 may be configured with other mechanisms, processes and functionalities, depending upon a particular implementation.

Grammar tool 122 includes rule composer 124 and feedback module 126, which are also explained in more detail below. Rule composer 124 and feedback module 126 are described separately for ease of illustration, but may be collectively implemented as one or many modules. Rule composer 124 is configured to receive information about grammar rules and to test the performance of grammar rules defined therein.

Feedback module 126 receives certain grammar rules from rule composer 124 and applies the grammar rules to documents, to detect violations of the grammar rules in the documents. When the pattern for a rule matches a sequence of characters in the text of a document, that sequence of characters is termed a violation of the grammar rule, for ease of illustration. Server device 120 may receive a document to be analyzed by feedback module 126 from client device 110 over network 130.

Thus, in the embodiment of the invention illustrated in FIG. 1, a user of client device 110 may request from grammar tool 122 a web page configured to receive information about a new grammar rule definition. Rule composer 124 may send the requested web page to client device 110, over network 130. Rule composer 124 receives the information for the new grammar rule definition and facilitates testing the grammar rule that is defined in the new definition to gauge the performance of the rule. When the user indicates that the new grammar rule is active, feedback module 126 applies the new grammar rule to documents submitted to feedback module 126 for feedback.

Server device 120 is communicatively coupled to database 140. Database 140 may be implemented by any type of storage, including volatile and non-volatile storage. Examples of database 140 include, without limitation, random access memory (RAM) and one or more disks. Database 140 may be external to server device 120, as shown in example network arrangement 100, or may be implemented as an internal component of server device 120.

In another embodiment of the invention, a grammar tool client is installed on client device 110. For example, one or more modules of a grammar tool client may be implemented as a part of application 112 or browser 114, e.g., as a plug-in. In this embodiment of the invention, the one or more modules of the grammar tool client may communicate with server device 120, for example, to receive updated grammar rules from one or more grammar tool modules running on server device 120.

Providing Grammar Feedback

A user may request that grammar tool 122 analyze a particular document for violations of grammar guidelines and return any feedback to the user. Feedback module 126 may receive such documents and apply, to the documents, the active rules that are available to grammar tool 122. Grammar rules that are available to grammar tool 122 may be the set of grammar rules that have been defined through rule composer 124, which have not been removed or deleted.

For example, a user at client device 110 may create a document using application 112. The user may request, through browser 114, a web page that is configured to receive a path expression that identifies a document. The user identifies the created document via the received web page, and the document is uploaded to server device 120 such that grammar tool 122 has access to the document.

Feedback module 126 then applies active grammar rules that are available to grammar tool 122 to the uploaded document. Feedback module 126 may insert comments into the submitted document at rule violations that are identified based on the grammar rules. Information about the modified document and the original document, as submitted by the user, may be stored in a database, e.g., database 140. The modified document may also be returned to the user. As such, the user may receive grammar feedback on the submitted document.

Level-Based Grammar Rules

A grammar rule available to grammar tool 122 may be associated with a level. In one embodiment, a rule with a particular level is only applied to documents that are also associated with the particular level. For example, a rule is associated with a high school level. In this example, the rule is only applied to documents that are also associated with the high school level. The level associated with a document may be included as an attribute of the document, or may be included in metadata associated with the document.

In one embodiment of the invention, grammar rule levels are hierarchical. For example, a rule may be classified as pertaining to one of two levels: high school, and collegiate. Documents that are submitted to feedback module 126 are also associated with either the high school or collegiate level. In this example, the high school level rules are at a lower hierarchical level than the collegiate level rules. Thus, high school level rules may be applied to both high school level documents and collegiate level documents. In contrast, collegiate level rules may be applied only to collegiate level documents, and not to high school level documents. In this embodiment, collegiate level rules may detect sophisticated grammar guideline violations and may provide detailed feedback that would not be appropriate for high school level documents. In contrast, high school level rules may provide generalized feedback on violations of fundamental grammar guidelines that are appropriate for both high school and collegiate level documents.

Thus, using the level attribute, the author of a grammar rule may indicate that the rule should be applied to documents with particular attributes, e.g., honors documents, technical reports, documents to be published in particular publications, documents written by doctoral or collegiate or high school students. A user may also have the option of indicating that the rule should be applied to all documents submitted to grammar tool 122 for feedback.

Administrative use of Information

Grammar tool 122 may record information about all violations of active rules that are detected in documents submitted for feedback by users. Such information may be stored at database 140. Stored information about violations of active rules may be requested from grammar tool 122. For example, an administrator of a rule may request stored information about violations of the rule for purposes of monitoring the rule.

Furthermore, grammar tool 122 may compile and display summaries of information stored for violations of certain rules. For example, an administrator may request a report that indicates the frequency with which rules in each respective category have been violated in the last three months. The administrator may request that the results of the report be filtered or organized further by certain characteristics of rules and/or documents. Such a report may give an administrator information about grammar guidelines with high violation rates. In one embodiment of the invention, summary information is distributed only in response to a request. In another embodiment of the invention, the users that submit the documents for review do not have access to the information stored by grammar tool 122 at database 140.

Information about rule violations in documents with one or more common attributes may also be compiled. For example, a summary of rule violations occurring in documents that are associated with a particular class at a particular university that were submitted during a particular period of time may be compiled for distribution to the instructor of the class. Such a summary may indicate which people from the class submitted documents for feedback, the kinds of rule violations that occurred in the documents, and number of rule violations for each category, etc. Such a summary conveys information about weaknesses and trends in a particular group of documents.

In one embodiment, the leader of a group may request a summary of information relating to violations of grammar rules that are flagged in the text of documents written by authors that pertain to the group. The request may indicate that information about all violations that are flagged in the documents should be included in the summary, or that only information about violations of certain grammar rules should be included in the summary. As such, the request may include identifiers of one or more particular grammar rules to include in the summary, or one or more categories of rules to include in the summary. The leader of the group may also restrict the summary of information based on the date that the documents were submitted to the grammar tool, or by other attributes of the documents. Grammar tool 122 may gather a document's attributes, including information about a group to which the author of the document pertains, when the document is submitted to the tool.

For example, the teacher of a class may request that grammar tool 122 compile and display a summary of rule violations that have been flagged in documents submitted to the tool by students of the class. The teacher may restrict the summary information based on attributes of the documents submitted to the tool by members of the class, such as by assignment identifier, by the date and time that the document was submitted, or based on whether or not information about a particular document was previously included in a summary requested by the teacher, etc. In this embodiment, only the teacher would be able to request such a summary, and students would not have access to the summary information through grammar tool 122.

Composing a Grammar Rule Definition

In one embodiment, grammar tool 122 of FIG. 1 is used to author and refine grammar rule definitions. To create a new grammar rule definition, a user of client device 110 may request a web page from rule composer 124 that includes a graphical user interface configured to receive information for the new grammar rule definition. FIG. 2 illustrates an example graphical user interface (GUI) 200 for gathering information for a new grammar rule definition. The data fields illustrated in FIG. 2 are merely exemplary. A grammar tool that implements the techniques described herein may use a GUI with different data fields than those depicted in GUI 200.

GUI 200 includes fields 202-226 to receive information for a new grammar rule definition. Field 202 includes an identifier for the rule definition. Rule composer 124 may assign to the new grammar rule definition an identifier that uniquely identifies the rule definition among all the other grammar rule definitions associated with grammar tool 122. In the example of FIG. 2, rule composer 124 has not yet assigned the new rule definition a rule identifier, as indicated by the designation of "[New]".

Field 204 receives information for a name, or alias, for the rule definition, which may be used for quick identification of the defined rule. For example, a user has indicated that the name of the new grammar rule definition is "Overly Long Sentence".

Field 206 receives information for a level for the rule definition, which may be used to indicate the type of documents to which the defined rule may be applied. Field 206 may include a drop-down list that is populated with levels of documents recognized by grammar tool 122. For example, the user has indicated that the level for the new grammar rule definition is "Collegiate".

Field 208 receives information for a category for the rule definition. A category of a rule definition may indicate a particular type of grammar guideline that is targeted by the defined rule. Field 208 may include a drop down list with established categories of grammar rules, such as punctuation, capitalization, word choice, etc. For example, the user has indicated that the new grammar rule definition is associated with a "Punctuation" category. Accordingly, the newly defined rule may be configured to detect violations of a punctuation grammar guideline.

Field 210 receives information for max inserts of a long comment and field 212 receives information for max inserts of a short comment. As illustrated in field 226, and described in further detail below, a rule definition may be associated with at least one "long" comment and at least one "short" comment. These comments may be provided as feedback on the text of a document submitted to grammar tool 122 to explain the one or more target grammar guidelines, to give suggestions for correction, to simply identify a problem, etc.

The text of a document that is submitted to grammar tool 122 for feedback may contain several strings that may be flagged by the defined grammar rule. Because grammar rules can produce false positives, a rule violation does not necessarily violate a grammar guideline. When a violation of a grammar rule is identified in the text of a document submitted for feedback, feedback module 126 inserts, into the text, a comment for the grammar rule at the point of the violation. For example, a comment indicated in field 226 for the rule definition of the grammar rule may be inserted into the text of a document immediately subsequent to a sequence of characters that are flagged as a violation of the rule.

If field 210 indicates that there is no limit on the maximum inserts of the long comment, then the "long" comment of field 226 is inserted at every violation of the particular rule in the document. However, if, at field 210, a finite limit is placed on the number of inserts of the long comment, e.g., a maximum of N long comments, then the "long" comment is only inserted for the first N number of rule violations in the text of the document.

Any rule violations that occur after the first N number of violations of the rule may be marked with the "short" comment from field 226. If field 212 indicates that there is no limit on the maximum number of inserts of the short comment, then every rule violation after the first N rule violations is marked with the "short" comment. If field 212 indicates a finite limit on the number of maximum inserts of the short comment, e.g., a maximum of M long comments, then only the first M violations of the rule occurring after the first N violations of the rule are marked by the short comment. Any other violations of the grammar rule are left unmarked.

Field 214 receives information for an explanation for the new grammar rule definition. An explanation may include an explanation of the pattern for the rule definition (included in Field 224), which is described in more detail below. Field 214 may include any information deemed appropriate by a user.

Field 216 is a checkbox that indicates whether the rule is active. In one embodiment, if the box is checked, then the rule is active and is applied by feedback module 126 to all documents submitted by users for feedback. If the box is unchecked, then the rule is inactive and is not applied by feedback module 126 to documents submitted by users for feedback.

In one embodiment, if the active box is checked, then the grammar rule is also applied to documents that are part of a batch of documents included in a "test run", in which one or more rules are applied to the text of a batch of documents. Test runs are described in further detail below. In this embodiment of the invention, field 218 may be disabled when the checkbox for field 216 is checked.

Field 218 is a checkbox that indicates whether the defined rule is active for testing batches. In one embodiment of the invention, if Field 218 is checked, then the rule is applied to documents that are part of a "test run" batch. If the box is unchecked, then the rule is not applied to documents that are part of a "test run" batch.

Field 220 is a checkbox that indicates whether the defined rule is hidden. In one embodiment of the invention, if the checkbox is checked, then comments from the rule definition are not provided for documents submitted to grammar tool 122 for feedback, regardless of the active or inactive status of the rule as indicated by field 216. If the checkbox is unchecked, then comments from the rule definition are provided in all appropriate documents on which the rule is applied. This embodiment is described in further detail below. Information about violations of the rule may be recorded, e.g., for administration purposes, regardless of whether the rule is marked as hidden.

Field 222 receives information for further notes on the rule definition, which may include a log of information on changes made to a rule definition, etc. As with field 214, any information deemed appropriate by a user may be included in field 222.

Field 224 receives a pattern for the rule definition. The pattern of a rule definition defines which sequences of characters would constitute violations of the defined rule. The pattern for a grammar rule may be authored using any number of techniques. For example, a grammar rule pattern may be defined using regular expressions (regexes). Regular expression is a convention for describing patterns in strings of characters.

Figure 3:
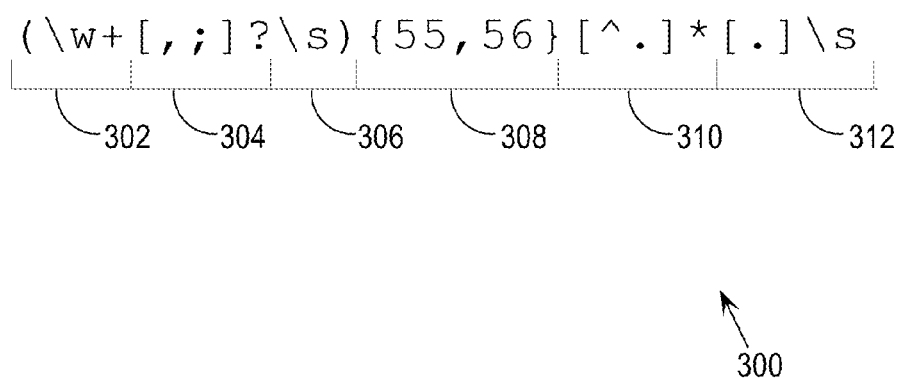
FIG. 3 illustrates a rule pattern that is authored using regular expressions.

The example illustrated in FIG. 2 includes the pattern "(\w+[,;]?\s){55,56}[^.]*[.]\s" in field 224. FIG. 3 illustrates this pattern as example pattern 300. Pattern 300 is authored using regular expressions, and describes a sequence of characters having at least 55 words before a period character is included in the sequence. Thus, pattern 300 may be used to flag overly long sentences in the text of a document.

Parts 302, 304 and 306 of pattern 300 represent a word pattern where one or more alphanumeric characters (part 302), possibly followed by a comma or semicolon (part 304), is followed by a space (part 306). Part 308 of pattern 300 indicates that the word pattern defined by parts 302-306 is repeated 55 or 56 times. Part 310 indicates that there may be zero or more characters, excluding period characters, after the 55 or 56 instances of the word pattern. Part 312 indicates that the pattern defined by parts 302-310 is followed by a period and a space.

A rule definition pattern may also be designed to detect one or more words of a natural language. For example, a pattern may include "\b the \s me \b" to detect instances of "the me" within the text of a document. Additionally, a rule definition pattern may be generalized to detect one of many possible articles followed immediately by one of many possible pronouns through use of keyword lists that have been established for the grammar tool. A keyword list includes one or more words in a particular natural language. Thus, a user may define a first keyword list that includes a set of English articles, such as "a" and "the", and a second keyword list that includes a set of English pronouns, such as "me" and "they". A rule definition pattern may then be established to include references to the keyword lists instead of referring to particular instances of articles and pronouns, as follows: "/b (_KEYWORDLIST_ENGLISH_ARTICLES) \s (_KEYWORDLIST_ENGLISH_PRONOUNS) /b".

In one embodiment of the invention, a rule definition may be configured to be applied to text in one of multiple natural languages. For example, the pattern for a rule definition may include a reference to a set of keyword lists, which set includes keyword lists that refer to similar words of multiple natural languages. For example, a user may establish a keyword list of English articles ("a", "the", etc.) and a keyword list of Spanish articles ("un", "el", etc.) and then create a keyword list set named _KEYWORDSET_ARTICLES that refers to the lists of English and Spanish articles. A similar keyword list set called _KEYWORDSET_PRONOUNS may be established using English pronouns ("me", "they", etc.) and Spanish pronouns ("yo", "ellos", etc.). A rule definition pattern as follows may be established, which detects an article followed immediately by a pronoun in both Spanish and English texts: "\b (_KEYWORDSET_ARTICLES)\s(_KEYWORDSET_PRONOUNS) \b". Such a pattern would match the following strings: "a me", "the me", "a they", "the they", "un yo", "un ellos", "el yo", and "el ellos".

When a rule is applied to a particular document, the text of the particular document is compared to the pattern of the rule's definition to determine whether one or more sequences of characters in the text match the pattern. Any sequence of characters that matches the pattern of a rule definition may be identified as a violation of the rule.

Returning to FIG. 2, field 226 receives information for one or more comments that may be inserted into the text of a document at a violation of the defined rule to identify the rule violation. Field 226 may receive information for a "long" comment and a "short" comment. The "long" comment may contain more detail than the "short" comment, in which case the "short" comment may be used as an abbreviated version of the "long" comment. For example, the user has indicated that the "long" comment for the new rule definition is "A sentence as long as this (55 or more words) can be confusing. Cut it into shorter sentences." The "short" comment is "This sentence is too long."

In the example of FIG. 2, field 226 includes only controls for receiving English comments. However, in one embodiment, controls for receiving several sets of comments may be included in a GUI such as GUI 200, each of which may be in a different natural language, e.g., English, Spanish, Italian, etc. A GUI such as GUI 200 may also include controls for receiving comments in various dialects of a natural language, such as Canadian English, Jamaican English, etc. Grammar tool 122 may select, for insertion into a document, a particular comment from the definition of a particular rule based on one or more attributes associated with the document. For example, an attribute of a particular document submitted to grammar tool 122 for feedback may indicate that the document is in Spanish. Therefore, grammar tool 122 inserts, into the document, comments in Spanish that are applicable to the text of the document.

Including Keyword Handles in Comments

A pattern may include a keyword handle that refers to the particular word of a keyword list that was detected in the text of a document based on the pattern. For example, the pattern "\b (_KEYWORDSET_ARTICLES) \s(?<pronoun>_KEYWORDSET_PRONOUNS) \b" includes a handle, "?<pronoun>", to the word detected from _KEYWORDSET_PRONOUNS.

A comment for the rule definition corresponding to the pattern may be configured to refer to the keyword handle in the pattern, thereby including the detected word. For example, in an English comment for the rule definition corresponding to the above pattern, a user may include the keyword handle as follows: "You must capitalize "?<pronoun>" in this case." In a Spanish comment for the rule definition corresponding to the above pattern, the user may include a parallel comment, such as "Usted debe capitalizar "?<pronoun>" en este caso."

If the rule definition of the above example is applied to the text of an English document, and "a me" is detected based on the pattern, then the grammar tool provides the following feedback for the detected string: "a me [You must capitalize "me" in this case.]". Similarly, if the rule definition is applied to the text of a Spanish document, and "el yo" is detected based on the pattern, then the grammar tool may provide the following feedback for the detected string: "el yo [Usted debe capitalizar "yo" en este caso.]".

Initial Testing of the Compound Grammar Rule

Ideally, a rule pattern would match all violations of its target grammar guideline without producing any false positives. Thus, in the example of pattern 300, it is desirable that the pattern match as many instances of overly long sentences as possible. However, it is also important that a pattern does not match sequences of characters that do not violate the target grammar guideline. If a rule that is encoded in grammar tool 122 produces false positive identifications of grammar guideline violations, users of grammar tool 122 may lose confidence in the feedback provided by the tool.

Through rule composer 124, a grammar rule designer may test a rule for proper performance. In one aspect of the invention, the grammar rule designer applies a particular rule to a string that is known to contain a violation of the target grammar guideline. A string that includes a known violation of a grammar guideline is referred to herein as a violation string for ease of illustration. GUI 200 includes field 228 to receive a violation string. A user, e.g., the author of the rule definition, may input a violation string into field 228 and activate control 230, which causes rule composer 124 to apply the pattern in field 224 to the violation string.

Field 234 displays the violation string and any comments that would be inserted into the violation string based on application of the rule. Field 232 is a checkbox that, if checked, causes the sequence of characters in the violation string that matches the pattern of the rule to be highlighted in field 234. If the result in field 234 is unexpected, the author may revise the pattern in field 224 to refine the pattern.

In the example of FIG. 2, a user has provided the following overly long sentence that violates the target grammar guideline in field 228 of GUI 200:

A very long sentence, such as this sentence, which has 55 or more words, can be confusing in that it can obscure the meaning of the sentence with logic twists and recursions, which can be very confusing to a reader, and should be cut it into shorter sentences that each embody a single idea that is easier to comprehend.

The user checks the checkbox of field 232 and activates control 230 to apply the pattern in field 224 to the violation string in field 228. Because the entire violation string matches the pattern in field 224, field 243 displays the violation string, all of which is highlighted, accompanied by the "long" comment from field 226.

A user may include characters in field 228 that do not match with the pattern of field 224 (not shown in FIG. 2). Furthermore, a user may include, in field 228, a string that does not include any violations of the target grammar guideline to test for possible false positive results (also not shown in FIG. 2).

Testing the Grammar Rule Against a Batch of Sample Documents

Testing a grammar rule against a violation string may not thoroughly determine whether the rule has an acceptably low rate of false positives. Furthermore, such a test does not allow a user to determine whether the rule provides redundant or conflicting feedback with other grammar rules available to grammar tool 122. Also, the test included in GUI 200 does not determine whether the run time of the grammar rule is acceptable.

To more thoroughly test a grammar rule, the rule may be applied to the text of a batch of documents. For purposes of illustration, the application of one or more grammar rules to a batch of documents is referred to herein as a "test run". Information about the results of a test run may give a user insight into the performance of one or more grammar rules, including whether a rule identifies false positives, how long it takes to apply a rule to a batch of documents, and whether a grammar rule gives conflicting or redundant feedback, etc.

Figure 4:
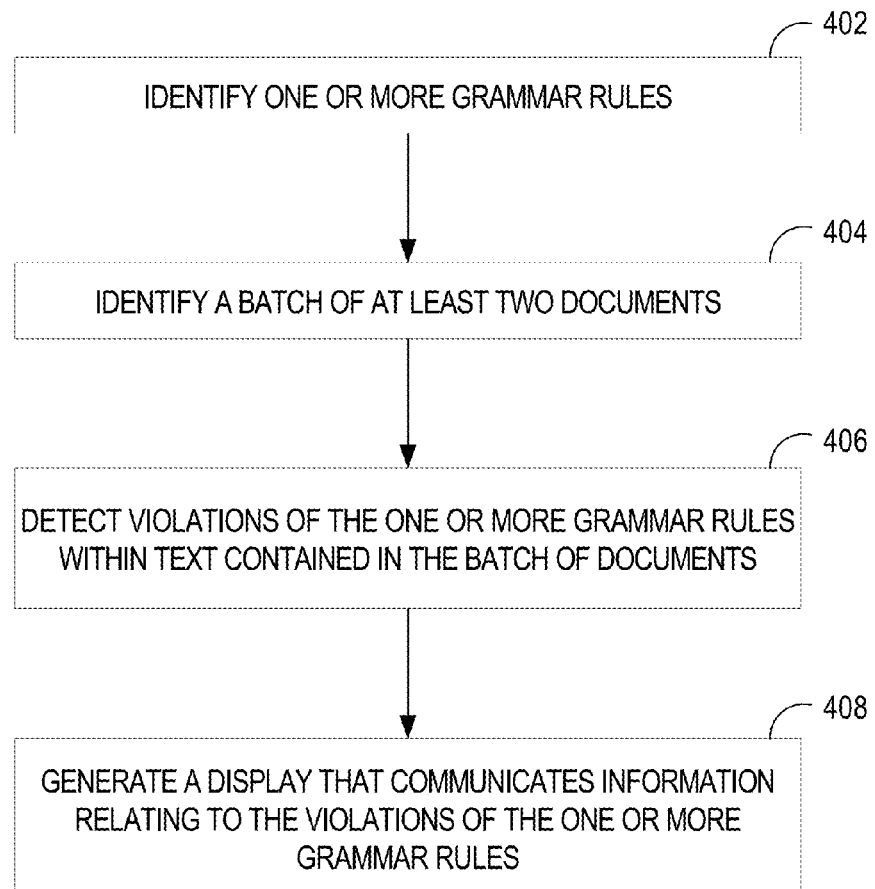
FIG. 4 illustrates an example method of performing a test run of one or more rules applied to the text of a batch of documents.

FIG. 4 illustrates an example method 400 of performing a test run. At step 402, one or more grammar rules are identified. For example, rule composer 124 may provide, to a user, a GUI to receive indicators of one or more stored grammar rules. The GUI may be configured to receive one or more rule identifiers, such as the rule identifiers of field 202 of FIG. 2. The GUI may also be configured to receive one or more categories of rules, such as the categories of field 208 of FIG. 2. If a user indicates a category of rules, then all of the rules in the category are identified.

The GUI may also be configured to display all of the grammar rules available to grammar tool 122 and allow a user to select one or more of the displayed grammar rules. Thus, a user may choose to perform a test run with a single rule, e.g., that the user has recently authored, or a user may choose to perform a test run that includes multiple rules that are applied to the text of the batch of documents in conjunction. The rules identified at step 402 may be a subset of the grammar rules available to grammar tool 122, that is to say, a user may select multiple grammar rules that constitute less than all of the grammar rules available to grammar tool 122.

At step 404, a batch of at least two documents are identified. In one embodiment of the invention, a batch of documents includes two or more documents. To illustrate, rule composer 124 may provide a GUI to receive indicators of two or more documents that are available to grammar tool 122. Thus, through the GUI, a user may indicate that the one or more grammar rules identified at step 402 are to be applied to the identified batch of documents in a test run.

The GUI may be configured to receive indicators of one or more groups of documents. Such a group of documents may be specified by the user that is testing the grammar rule. For example, the user may specify a particular group of documents by indicating one or more specific document properties. For example, the user may specify doctoral papers, high quality documents (e.g. documents that have a relatively low number of violations of existing grammar rules), poor quality documents (e.g. documents that have a relatively high number of violations of existing grammar rules), documents written by people in a particular profession or particular course of study, documents from a particular class at a university or high school, etc. The batch of documents may also be specified as those documents that include known violations of certain other grammar rules.

A user may also identify a batch by indicating to rule composer 124 a path expression that identifies a location of two or more documents. The user may request that rule composer 124 include, in the batch of documents, all of the documents at the identified location, or may request that grammar tool automatically select a certain number of documents at the identified location for the batch.

Rule composer 124 may also be configured to automatically identify a certain number of documents from a pool of documents available to grammar tool 122. A user may specify the number of documents to be included in the test run, e.g., five thousand, ten thousand, twenty thousand, etc. The pool of documents may include all documents that have been submitted to grammar tool 122. The pool of documents may also include only documents with one or more common attributes, which common attributes may be indicated by the user that is performing the test run of the new grammar rule. For example, a pool of documents from which rule composer 124 automatically selects a batch of documents for a test run may all be documents associated with a particular publication or journal, documents associated with a particular major at a particular university, or documents written by people who have the same amount of schooling, or may have a common category, source, quality, language, type, level, etc.

At step 406, violations of the one or more grammar rules are detected within text contained in the batch of documents. For example, grammar tool 122 applies the patterns of each of the one or more grammar rules, identified at step 402, to each document of the batch of documents, identified at step 404. The locations of sequences of characters that match one or more of the grammar rule patterns are stored, e.g., in database 140. Furthermore, information about any comment that would be inserted at the location of a rule violation may also be stored in database 140.

At step 408, a display is generated that communicates information relating to the violations of the one or more grammar rules. For example, grammar tool 122 may produce a GUI, such as GUI 500 of FIG. 5, to display information about the results of a test run. The GUI may include information on violations of the one or more grammar rules of the test run in each document of the batch of documents. Such information may include (a) a total run time for detecting violations of a particular grammar rule in the test run; (b) a total run time for detecting violations of all of the grammar rules of the test run; (c) a sequences of character from the text contained in the batch of documents that is flagged as a violation of a particular grammar rule in the test run; (d) a comment associated with a flagged violation of a particular grammar rule; (e) one or more characters in the text contained in the batch of documents that occur proximate to a sequence of characters that is flagged as a violation of a particular grammar rule; (f) an attribute of a particular grammar rule; and (g) the time elapsed to apply the rules of the test run to each document of the batch, etc. The information about elapsed time may be used to determine the efficiency of applying the one or more grammar rules to documents.

Example GUI 500 includes table 502 to display information about rule violations identified in the text of the batch of documents for the test run. Table 502 includes a Rule ID column, a Document Name column, and a Text column. The Rule ID column includes the unique identifier of the grammar rule that corresponds to each rule violation. The Document Name column includes the name of the document in which each rule violation has been identified. The Text column shows information about the rule violation itself, including context of the rule violation and any comment that may be inserted at the rule violation.

GUI 500 allows a user to adjust the information displayed in the Text column of table 502. Fields 504 and 506 allow a user to indicate a number of characters of the document text, proximate to the rule violation in the text, to be displayed in the Text column. Specifically, field 504 receives a number of characters to be displayed before the detected rule violations, and field 506 receives a number of characters of the document text to be displayed after the rule violations. In the example of FIG. 5, thirty characters are displayed before each rule violation and ten characters are displayed after each rule violation.

Field 508 is a checkbox which, when checked, indicates that the sequence of characters that matches the corresponding rule pattern should be highlighted in table 502. In the example of FIG. 5, the checkbox of field 508 is checked, and therefore, the sequences of characters that match the rule patterns are highlighted in table 502.

Field 510 is a checkbox which, when checked, indicates that the comment that would be inserted near the rule violation in the text of the corresponding document should be shown. In the example of FIG. 5, the checkbox for field 510 is checked, and therefore, the comment that would be inserted at each rule violation is shown in table 502.

Activation of control 512 updates the information displayed in table 502 to conform to a user's selections in fields 504-510. Also, the set of controls 514 allows a user to view additional rule violations from the test run.

Thus, a display, such as GUI 500, may be used to summarize the performance of one or more grammar rules as applied to a particular batch of documents. A GUI configured to display the results of a test run may have more or less information and/or controls than GUI 500 within the embodiments of the invention. For example, a GUI such as GUI 500 may be configured to display additional attributes of a particular grammar rule or rule violation that are not shown in FIG. 5.

User Review of the Results of a Test Run

In one embodiment, information about a particular test run is stored for later use and comparison with other test runs. For example, grammar tool 122 may store, in database 140, information about the one or more rules associated with a test run and the batch of documents for a test run, as well as information about the results of the test run and other attributes of the test run.

In one embodiment of the invention, the results of a test run are made available to one or more users, such as experts in grammar guidelines, for evaluating whether one or more of the violations of particular rules, detected in the test run, are also violations of the grammar guidelines targeted by the particular rules. For example, GUI 600 of FIG. 6 displays the results of a test run in a manner similar to GUI 500. However, table 602 of GUI 600 includes a fourth column called "Correct?". In the Correct? column of table 602, a user may indicate whether a violation of a grammar rule is actually a violation of the grammar guideline that is the target of the rule, based on a manual review.

In the example of GUI 600, a user, such as a grammar expert, has indicated that the first, second, third, and fifth rule violations in the display of table 602 are also violations of the respective target grammar guidelines of the rules. However, for the fourth rule violation, a user has indicated that the rule violation is not a violation of the target grammar guideline. The sixth, seventh, eighth, and ninth rule violations in table 602 have not been evaluated by a user for correctness.

In one embodiment, a user may request that a certain set of users evaluate the results of a test run, as illustrated in GUI 600. A subset of the rule violations resulting from a test run may be assigned to each user of the certain set of users for manual review. In the embodiment shown in GUI 600, only one user may indicate the correctness of a particular rule violation. In another embodiment of the invention, multiple users may indicate the correctness of a single rule violation.

A user may request from grammar tool 122 a summary of the correctness evaluations for a particular test run. Such a summary may include a percentage of the rule violations for a particular rule that were indicated to be incorrect. For example, in a particular test run, rule composer 124 determines that the text of a batch of documents for the test run includes 100 violations of a particular grammar rule. One or more users review the 100 rule violations and find that 82 of the 100 rule violations are also violations of the target grammar guideline and that 18 of the 100 rule violations are not violations of the target grammar guideline. In this example, the summary of correctness indicators for the particular grammar rule would show that the rule has an 18% false positive rate. A summary of the correctness evaluations for a particular test run may include other statistics or information to communicate the correctness evaluation information within the embodiments of the invention.

Testing for Grammar Rule Correlation

To test for grammar rules that give redundant or contradicting feedback, a user may include two or more rules that target the same category of grammar guidelines, or that are suspected of producing redundant or contradicting feedback, in a single test run. Rules that give redundant or contradicting feedback will have a high correlation in the placement of violations of the respective rules. Thus, to identify such grammar rules, the results of the test run may be analyzed to identify situations in which the strings that were flagged by two or more rules are in highly correlated locations in the text of the batch of documents. Such rules are referred to herein as "high-correlation grammar rules" for ease of illustration.

Furthermore, in one embodiment of the invention, grammar tool 122 tracks statistics of the placement of rule violations that are identified in a test run. For example, rule composer 124 may track the index of violations of each rule included in a particular test run. An index of a rule violation uniquely identifies the location of the rule violation in the text of a particular document. For example, if each character in a particular document is assigned a unique number, then the index of a rule violation may be any combination of the following: (a) the assigned number of the first character of the rule violation character sequence, (b) the assigned number of the last character of the rule violation character sequence, (c) the count of characters in the rule violation sequence, and (d) a unique identifier of the document in which the rule violation is detected.

In one embodiment, the statistics gathered by grammar tool 122 are organized and presented in a GUI to facilitate identification of high-correlation grammar rule definitions.

In another embodiment, grammar tool 122 automatically identifies grammar rules that are high-correlation grammar rules based on the tracked statistics, and certain thresholds that may be specified by a user. To illustrate, two grammar rules may be considered to be highly correlated if more than a certain percentage of the violations of the two rules coincide. Two rule violations may be considered as coinciding if the respective indexes of the rule violations are within a certain threshold of each other, e.g., within five characters. For example, a user may indicate that two rules are highly correlated if over 50% of the violation locations of one rule coincide with locations of violations of another rule.

Alternatively, two rules may be identified as highly correlated if the total number of rule violations of the two rules that coincide exceeds a specified threshold. For example, a user may indicate that two rules are highly correlated if the total number of coinciding rule violations between the two rules exceeds the total number of documents in the batch. A user may also specify a finite numerical threshold. For example, a user may indicate that two rules are highly correlated if the total number of coinciding rule violations between the two rules exceeds 500 violations.

According to one embodiment, information about the high-correlation grammar rules is displayed in a GUI. Thus, grammar tool 122 may generate a display with information on rules included in a particular test run that have automatically been determined, by rule composer 124, to be high-correlation grammar rules.

Testing the Grammar Rule in a Live Setting

As indicated above, a rule may be marked as hidden. Feedback module 126 applies all active grammar rules to documents submitted thereto for feedback. However, according to one embodiment, active rules that are hidden do not produce feedback for the users that submit documents to feedback module 126 for feedback.

Because information about violations of hidden grammar rules is stored by grammar tool 122, a hidden grammar rule may serve as an information gathering technique. For example, a hidden rule may be useful to track information about certain word patterns that occur within documents submitted to grammar tool 122, where the word patterns do not violate any grammar guidelines. Furthermore, the information about violations of a hidden rule may be used to determine how well the hidden rule would replace one or more active unhidden rules that are currently being applied by feedback module 126.

Figure 7:
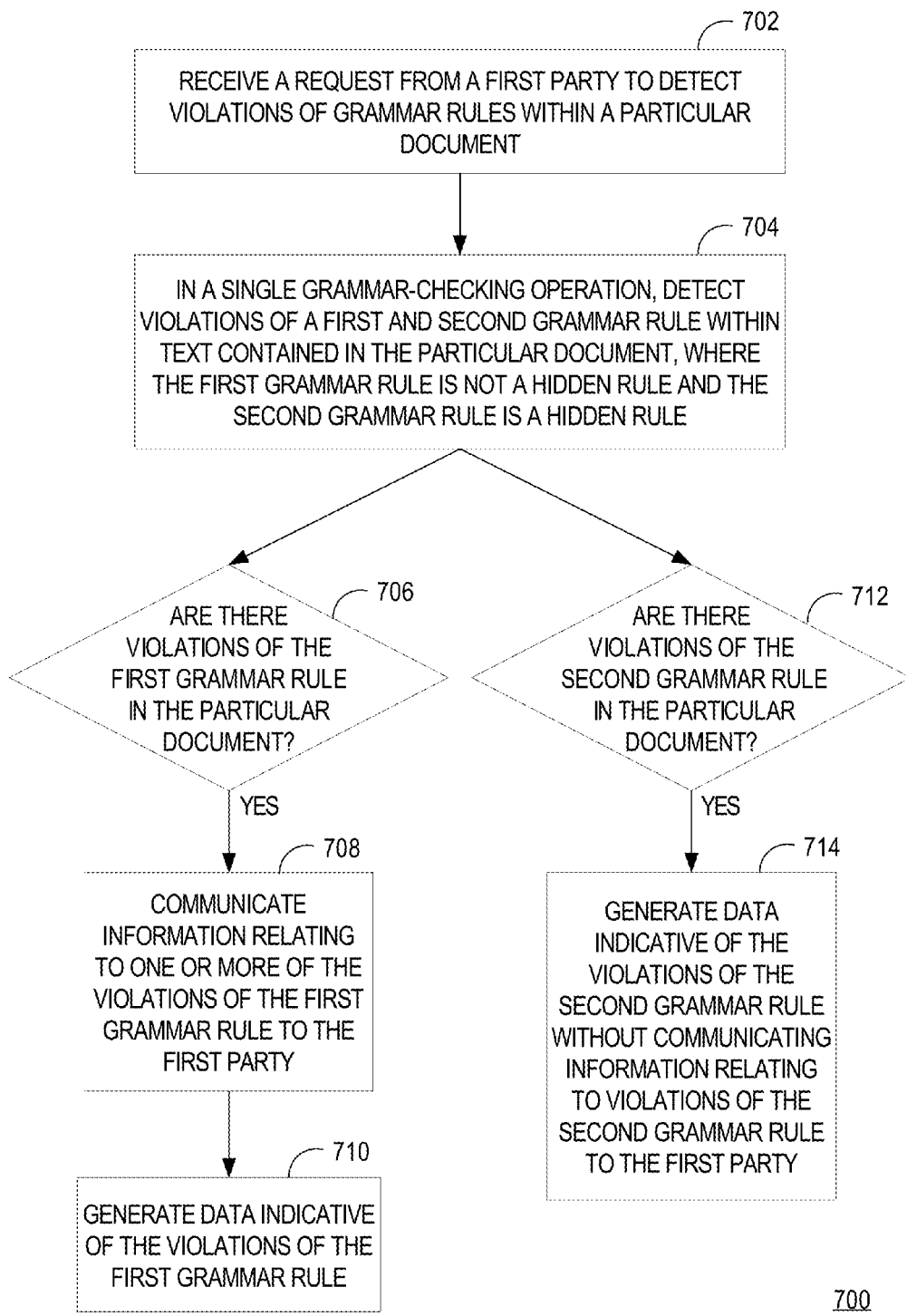
FIG. 7 illustrates an example method of detecting violations of active hidden and unhidden rules.

FIG. 7 illustrates an example method 700 of detecting violations of active hidden and unhidden rules, according to embodiments of the invention. At step 702, a request from a first party to detect violations of grammar rules within a particular document are received. For example, a user of client device 110 submits a document to grammar tool 122 for feedback analysis.

At step 704, in a single grammar-checking operation, violations of a first and second grammar rule are detected within text contained in the particular document, where the first grammar rule is not a hidden rule and the second grammar rule is a hidden rule. For example, feedback module 126 applies two different grammar rules to the particular document submitted by the user. The first grammar rule of the two grammar rules is not a hidden rule, e.g., field 220 of FIG. 2 was not checked for the definition of the first grammar rule. The second grammar rule of the two grammar rules is a hidden rule.

At step 706, it is determined whether there are violations of the first grammar rule in the particular document. For example, feedback module 126 analyzes the text of the submitted document to determine if the text includes any sequences of characters that match the pattern for the unhidden grammar rule.

If rule violations for the unhidden rule are detected within the particular document, then control moves to step 708. At step 708, information relating to one or more of the violations of the first grammar rule are communicated to the first party. For example, feedback module 126 inserts a comment associated with the unhidden rule into the text of the submitted document at the violation of the unhidden rule. The modified document is returned to the user to communicate the rule violation to the user.

At step 710, data indicative of the violations of the first grammar rule are generated. For example, grammar tool 122 stores information in database 140 about the rule violation of the unhidden rule, e.g., for administrative use.

At step 712, it is determined whether there are violations of the second grammar rule in the particular document. For example, feedback module 126 analyzes the text of the submitted document to determine if the text includes any sequences of characters that match the pattern for the hidden grammar rule.

If rule violations for the hidden rule are detected within the particular document, then control moves to step 714. At step 714, data indicative of the violations of the second grammar rule is generated without communicating information relating to violations of the second grammar rule to the first party. For example, grammar tool 122 records information in database 140 about violations of the hidden grammar rule, e.g., for administrative use. However, feedback module 126 does not insert any comments into the text of the submitted document for the violations of the hidden grammar rule. Therefore, the user does not receive any information about violations of the hidden grammar rule.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
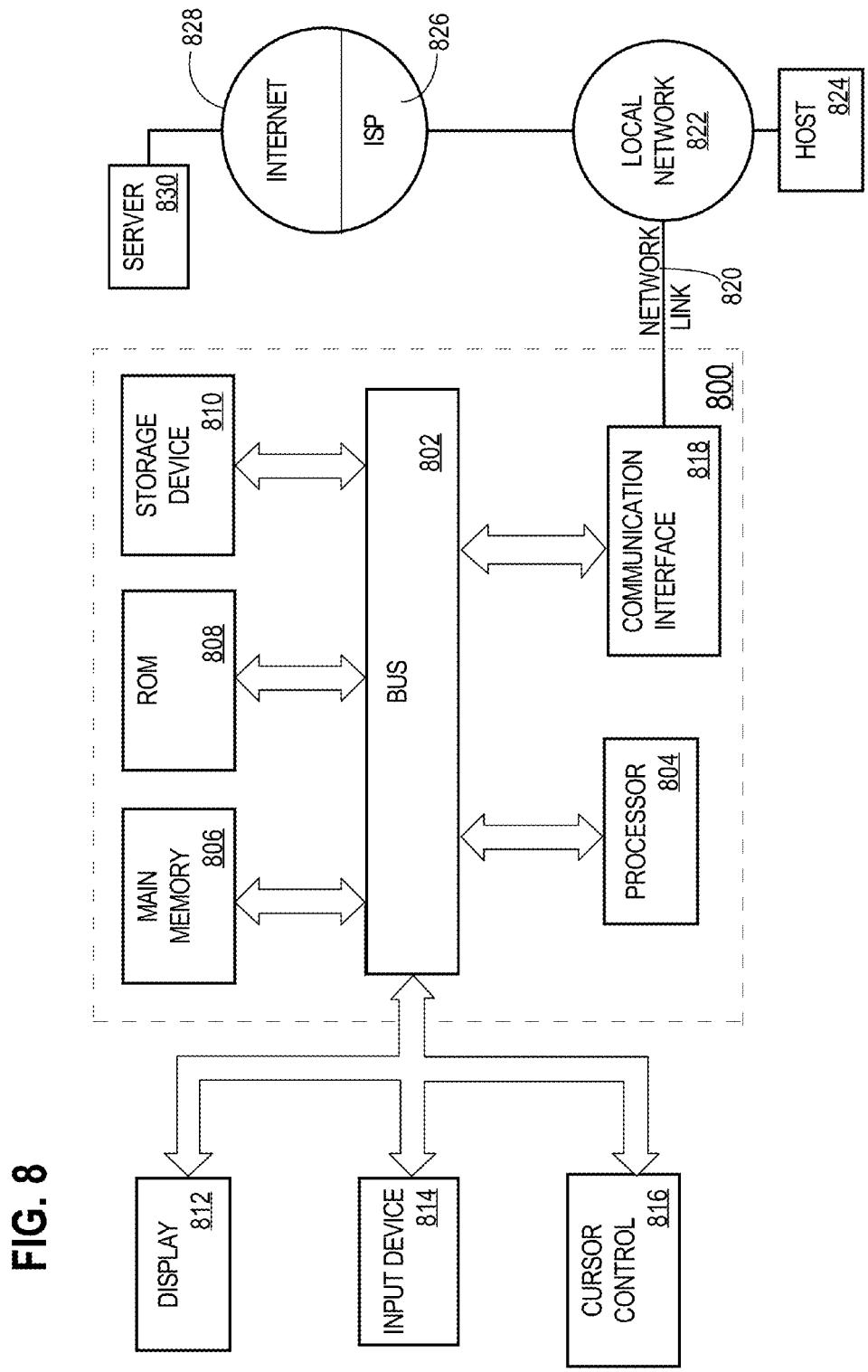
FIG. 8 is a block diagram of a computer system on which embodiments of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method comprising:
    displaying a user interface with a control for receiving grammar rule definitions;
    receiving, through the control, a first input that defines a particular grammar rule;
    receiving a second input that selects a batch of documents;
    wherein the batch of documents comprises at least two documents from a pool of documents;
    wherein the pool of documents comprises both:
        the at least two documents, and one or more other documents that are not included in the batch of documents;
    based at least in part on the second input, detecting violations of the particular grammar rule within text contained in the batch of documents;
    based at least in part on the second input, causing display of information, in a particular user interface, relating to the violations of the particular grammar rule;
    wherein the displayed information indicates violations of the particular grammar rule in multiple documents within the batch of documents;
    wherein the particular user interface includes a particular control associated with each rule violation, for indicating whether the rule violation is actually a rule violation without changing the contents of the document in which the rule violation was identified;
    wherein the method is performed by one or more computing devices.

2. The computer-executed method of claim 1, further comprising:
    causing display of the user interface with a second control for requesting detection of violations of the particular grammar rule within text contained in the batch of documents;
    receiving, through the second control, a request to detect violations of the particular grammar rule within text contained in the batch of documents; and
    only in response to the request, detecting violations of the particular grammar rule within text contained in the batch of documents.

3. The computer-executed method of claim 1, wherein detecting violations of the particular grammar rule comprises detecting violations of only the particular grammar rule.

4. The computer-executed method of claim 1, wherein the method further comprises receiving input that identifies one or more additional grammar rules; wherein detecting violations comprises detecting violations of a plurality of grammar rules comprising the particular grammar rule and the one or more additional grammar rules; the method further comprising causing display of information relating to the violations of each of the one or more additional grammar rules.

5. The computer-executed method of claim 4, wherein receiving input that identifies one or more additional grammar rules comprises:
    causing display of information that lists a first set of grammar rules;
    receiving user input that selects a second set of grammar rules;
    wherein said second set of grammar rules is a subset of said first set of grammar rules; and
    wherein the one or more additional grammar rules belong to said second set of grammar rules.

6. The computer-executed method of claim 4, wherein the method further comprises:
    identifying a subset of the plurality of grammar rules as high-correlation grammar rules based on locations of violations of the subset of the plurality of grammar rules within the batch of documents; and
    causing display of information that identifies the high-correlation grammar rules.

7. The computer-executed method of claim 1, further comprising:
    causing display of information that indicates the violations of the particular grammar rule to a panel of multiple users;
    receiving, from each user of the panel of multiple users, data that specifies whether a violation of the violations represents a false positive;
    aggregating the data received from the panel of multiple users to produce aggregated feedback; and
    causing display of information comprising the aggregated feedback.

8. The computer-executed method of claim 1, wherein the information relating to the violations of the particular grammar rule includes at least one of:
    (a) one or more character sequences from the text contained in the batch of documents that violates the particular grammar rule;
    (b) one or more comments associated with a violation of the particular grammar rule;

(c) one or more characters in the text contained in the batch of documents that occur proximate to one or more character sequences that violate the particular grammar rule; or (d) one or more attributes of the particular grammar rule.

9. The computer-executed method of claim 1, wherein the second input that selects the batch of documents identifies one or more attributes of the at least two documents of the batch of documents, wherein the one or more other documents do not have the one or more attributes.

10. The computer-executed method of claim 1, wherein the first input defines a pattern that, if present in text, would violate the particular grammar rule, wherein the pattern is based at least in part on at least two different parts in the text.

11. The computer-executed method of claim 1, wherein the first input defines a pattern that, if present in text, would violate the particular grammar rule, wherein the pattern is based at least in part on at least two different natural language words in the text.

12. The computer-executed method of claim 1, wherein the second input that identifies the batch of documents identifies how many documents, of the pool of documents, to include in the batch of documents.

13. The computer-executed method of claim 1, wherein the second input that identifies the batch of documents identifies a path expression that identifies a location of the batch of documents.

14. The computer-executed method of claim 1, wherein the information relating to the violations of the particular grammar rule includes a total run time for detecting violations of the particular grammar rule.

15. One or more non-transitory computer-readable media storing one or more sequences of instructions which, when executed by one or more processors, cause:
displaying a user interface with a control for receiving grammar rule definitions;
receiving, through the control, a first input that defines a particular grammar rule;
receiving a second input that selects a batch of documents;
wherein the batch of documents comprises at least two documents from a pool of documents;
wherein the pool of documents comprises both:
the at least two documents, and
one or more other documents that are not included in the batch of documents;
based at least in part on the second input, detecting violations of the particular grammar rule within text contained in the batch of documents;
based at least in part on the second input, causing display of information, in a particular user interface, relating to the violations of the particular grammar rule;
wherein the displayed information indicates violations of the particular grammar rule in multiple documents within the batch of documents;
wherein the particular user interface includes a particular control associated with each rule violation, for indicating whether the rule violation is actually a rule violation without changing the contents of the document in which the rule violation was identified.

16. The one or more non-transitory computer-readable media of claim 15, wherein the one or more sequences of instructions further comprise instructions which, when executed by one or more processors, cause:
causing display of the user interface with a second control for requesting detection of violations of the particular grammar rule within text contained in the batch of documents;
receiving, through the second control, a request to detect violations of the particular grammar rule within text contained in the batch of documents; and
only in response to the request, detecting violations of the particular grammar rule within text contained in the batch of documents.

17. The one or more non-transitory computer-readable media of claim 15, wherein detecting violations of the particular grammar rule comprises detecting violations of only the particular grammar rule.

18. The one or more non-transitory computer-readable media of claim 15, wherein the one or more sequences of instructions further comprise instructions which, when executed by one or more processors, cause:
receiving input that identifies one or more additional grammar rules;
wherein detecting violations comprises detecting violations of a plurality of grammar rules comprising the particular grammar rule and the one or more additional grammar rules; and
causing display of information relating to the violations of each of the one or more additional grammar rules.

19. The one or more non-transitory computer-readable media of claim 18, wherein receiving input that identifies one or more additional grammar rules comprises:
causing display of information that lists a first set of grammar rules;
receiving user input that selects a second set of grammar rules;
wherein said second set of grammar rules is a subset of said first set of grammar rules; and
wherein the one or more additional grammar rules belong to said second set of grammar rules.

20. The one or more non-transitory computer-readable media of claim 18, wherein the one or more sequences of instructions further comprise instructions which, when executed by one or more processors, cause:
identifying a subset of the plurality of grammar rules as high-correlation grammar rules based on locations of violations of the subset of the plurality of grammar rules within the batch of documents; and
causing display of information that identifies the high-correlation grammar rules.

21. The one or more non-transitory computer-readable media of claim 15, wherein the one or more sequences of instructions further comprise instructions which, when executed by one or more processors, cause:
causing display of information that indicates the violations of the particular grammar rule to a panel of multiple users;
receiving, from each user of the panel of multiple users, data that specifies whether a violation of the violations represents a false positive;
aggregating the data received from the panel of multiple users to produce aggregated feedback; and
causing display of information comprising the aggregated feedback.

22. The one or more non-transitory computer-readable media of claim 15, wherein the information relating to the violations of the particular grammar rule includes at least one of:
(a) one or more character sequences from the text contained in the batch of documents that violates the particular grammar rule;
(b) one or more comments associated with a violation of the particular grammar rule;

(c) one or more characters in the text contained in the batch of documents that occur proximate to one or more character sequences that violate the particular grammar rule; or (d) one or more attributes of the particular grammar rule.

23. The one or more non-transitory computer-readable media of claim 15, wherein the second input that selects the batch of documents identifies one or more attributes of the at least two documents of the batch of documents, wherein the one or more other documents do not have the one or more attributes.

24. The one or more non-transitory computer-readable media of claim 15, wherein the first input defines a pattern that, if present in text, would violate the particular grammar rule, wherein the pattern is based at least in part on at least two different parts in the text.

25. The one or more non-transitory computer-readable media of claim 15, wherein the first input defines a pattern that, if present in text, would violate the particular grammar rule, wherein the pattern is based at least in part on at least two different natural language words in the text.

26. The one or more non-transitory computer-readable media of claim 15, wherein the second input that identifies the batch of documents identifies how many documents, of the pool of documents, to include in the batch of documents.

27. The one or more non-transitory computer-readable media of claim 15, wherein the second input that identifies the batch of documents identifies a path expression that identifies a location of the batch of documents.

28. The one or more non-transitory computer-readable media of claim 15, wherein the information relating to the violations of the particular grammar rule includes a total run time for detecting violations of the particular grammar rule.

* * * * *